(12) United States Patent
Subramaniam et al.

(10) Patent No.: US 7,584,202 B2
(45) Date of Patent: Sep. 1, 2009

(54) HIGH PERFORMANCE IN MEMORY DATA CUBES

(75) Inventors: Krishnan R. Subramaniam, San Francisco, CA (US); Saugata Chowdhury, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 297 days.

(21) Appl. No.: 11/332,536

(22) Filed: Jan. 13, 2006

(65) Prior Publication Data

US 2009/0138489 A1    May 28, 2009

(51) Int. Cl.
G06F 7/00 (2006.01)
G06F 17/00 (2006.01)
(52) U.S. Cl. .............................. 707/101; 707/2; 707/100
(58) Field of Classification Search .................. 707/2, 707/101, 3, 100
See application file for complete search history.

(56) References Cited

U.S. PATENT DOCUMENTS

| | | | | |
|---|---|---|---|---|
| 5,943,677 | A * | 8/1999 | Hicks | 707/205 |
| 6,714,940 | B2 * | 3/2004 | Kelkar | 707/102 |
| 6,907,436 | B2 * | 6/2005 | Ye et al. | 707/203 |
| 2003/0023715 | A1 * | 1/2003 | Reiner et al. | 709/224 |
| 2005/0065620 | A1 * | 3/2005 | Maenishi et al. | 700/28 |
| 2005/0071349 | A1 * | 3/2005 | Jordan et al. | 707/100 |
| 2005/0165753 | A1 * | 7/2005 | Chen et al. | 707/3 |

OTHER PUBLICATIONS

Crenshaw, Jack; "A primer on Karnaugh Maps", Embedded.com, http://www.embedded.com/columns/programmerstoolbox/16100908?_requestid=300480, Nov. 17, 2003.*
Chakrabarti, Kaushik et al., "Local Dimensionality Reduction: A New Approach to Indexing High Dimensional Spaces", *National Science Foundation*, VLDB Submission No. 138.
Chakrabarti, Kaushik, et al., "The Hybrid Tree: An Index Structure for High Dimensional Feature Spaces", *1999 IEEE International Conference on Data Engineering* (Mar. 1999).
Charikar, Moses et al., "Incremental Clustering and Dynamic Information Retrieval", *Department of Computer Science, Stanford University*.
Lin, King-Ip, "The TV-tree—an index structure for high-dimensional data", *National Science Foundation*.

* cited by examiner

*Primary Examiner*—James Trujillo
*Assistant Examiner*—Marc Somers
(74) *Attorney, Agent, or Firm*—Townsend and Townsend and Crew LLP

(57) ABSTRACT

A solution is provided in which regions are formed incrementally as points are added to a database. Each time a point is added to the database, it may be assigned to a new region. This new region may then be compared against each of the current set of regions until one is found with which it can be successfully merged. Then, this newly merged region may be compared against each of the other regions until one is found with which it can be successfully merged. This process repeats until there are no more regions that can be merged. Determining whether or not a region can be merged with another region may involve determining whether or not the points in one region differ from the points in the other region only along one dimension. If so, then the point can be successfully merged with the region.

11 Claims, 4 Drawing Sheets

HIGH PERFORMANCE IN MEMORY DATA CUBES

FIELD OF THE INVENTION

The present invention relates to the field of multidimensional databases. More specifically, the present invention relates to high performance in memory data cubes.

BACKGROUND OF THE INVENTION

Database applications are commonly used to store large amounts of data. One branch of database applications that is growing in popularity is Online Analytical Processing (OLAP) applications. This typically involves designing databases for fast access. Using specialized indexing techniques, it processes queries that may pertain to large amounts of data and multidimensional databases much faster than traditional techniques.

Typically, a multidimensional database stores and organizes data in a way that better reflects how a user would want to view the data than is possible in a two-dimensional spreadsheet or relational database file. Multidimensional databases are generally better suited to handle applications with large volumes of numeric data and that require calculations on numeric data, such as business analysis and forecasting, although they are not limited to such applications.

A dimension within multidimensional data is typically a basic categorical definition of data. Other dimensions in the database allow a user to analyze a large volume of data from many different viewpoints or perspectives. Thus, a dimension can also be described as a perspective or view of a specific dataset. A different view of the same data is referred to as an alternative dimension.

One drawback to multidimensional databases is that they become sparse in large applications. The sparsity of a database refers to a relative lack of density of the values in the database. The fewer values in a multidimensional database in relation to the number of total cells in the database, the more sparse the database is said to be. Typically, as the number of dimensions grow, so does the sparsity. Sparse databases take up a large amount of space relative to the amount of actual data stored. As such, techniques for reducing the dimensionality of a database to arrive at denser cubes within the database may be utilized. One such technique is called clustering.

In clustering, similar cells having values in them may be grouped into a single region, resulting in a database having a number of regions, wherein each region represents a "dense" portion of the database. This eliminates or at least reduces the need to handle the sparse or empty areas of the database during storage, aggregation, and other functions.

Earlier attempts to form regions utilize time consuming algorithms that examiner the entire data set at once and separate the set into a number of regions. These algorithms require that the entire data set be known "a priori". This can be a very difficult restriction because data tends to grow incrementally, depending upon the operations within a multidimensional database system. Utilizing existing clustering algorithms means that the clustering of data for the entire data set needs to be re-computed whenever a single data point is added or deleted.

As such, clustering algorithms typically are not used in multidimensional databases as a data-storage structure. The cost of computing these regions for the whole data set during each update outweighs any benefit received from the optimized storage mechanism.

Additionally, the focus in earlier clustering techniques is in forming geometrically compact region. In other words, the decision to include a point in a region is based on its geometric distance from other points within the region. However, the geometry of a multidimensional cube can usually be easily altered. For example, it is typically quite easy to reorganize members of a dimension so that points that were geometrically proximate are now further apart. Thus, prior solutions fail to consider that the geometric distance between points is less important than whether the cross product of the respective dimensions creates a dense population of cells.

FIG. 1 is a graph diagram illustrating an example of a small multidimensional database. Here, a product dimension 100 list product names (Skis, Boots, Poles), a location dimension 102 lists countries (USA, Mexico, U.K., Canada), and a purchases dimension 104 lists monetary benefits (sales, profit). Also depicted in the graph are four points, labeled P1, P2, P3, and P4. P1 represents (Skis, USA, Sales), P2 represents (Poles, USA, Sales), P3 represents (Boots, USA, Profit), and P4 represents (Skis, Canada, Profit). Note that the dotted lines represent projections along the purchases dimension 104.

According to the prior art techniques, the points that are geometrically close to each other are clustered together in a region. P1, P2, and P3 are of equal distance to each other. This results in one region representing P1, P2, and P3, and a second region representing P4. Yet this is due partially to what essentially is an arbitrary ordering of elements within each dimension. For example, FIG. 2 represents the same points if we had chosen to swap Mexico and Canada in the ordering of the location dimension, and Boots and Skis in the products dimension. As can be seen, now P1 and P2 are equal distance apart and P3 and P4 are equal distance apart, resulting in a separate clustering of P1 and P2 in one region and P3 and P4 in the second region. This despite the fact that the underlying data is no different from FIG. 1 to FIG. 2.

Furthermore, the dependence on geometric distance as a criteria for clustering ignores perhaps the most relevant information for efficiency of the system: the information the user is interested in. For example, the regions generated by prior art techniques for FIG. 1 are made even worse in the instance that the user is most interested in Profit numbers, as the regions group the two profit points separately. It would have been more efficient if both profit points were in the same region, given the user's interest in those numbers.

Therefore, what is needed is a clustering solution that does not require that the entire data set be known a priori. Additionally, what is needed is a clustering solution that does not need to use geometric distance as the criterion to form regions.

BRIEF DESCRIPTION

A solution is provided in which regions are formed incrementally as points are added to a database. Each time a point is added to the database, it may be assigned to a new region. This new region may then be compared against each of the current set of regions until one is found with which it can be successfully merged. Then, this newly merged region may be compared against each of the other regions until one is found with which it can be successfully merged. This process repeats until there are no more regions that can be merged. Determining whether or not a region can be merged with another region may involve determining whether or not the points in one region differ from the points in the other region only along one dimension. If so, then the point can be successfully merged with the region.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
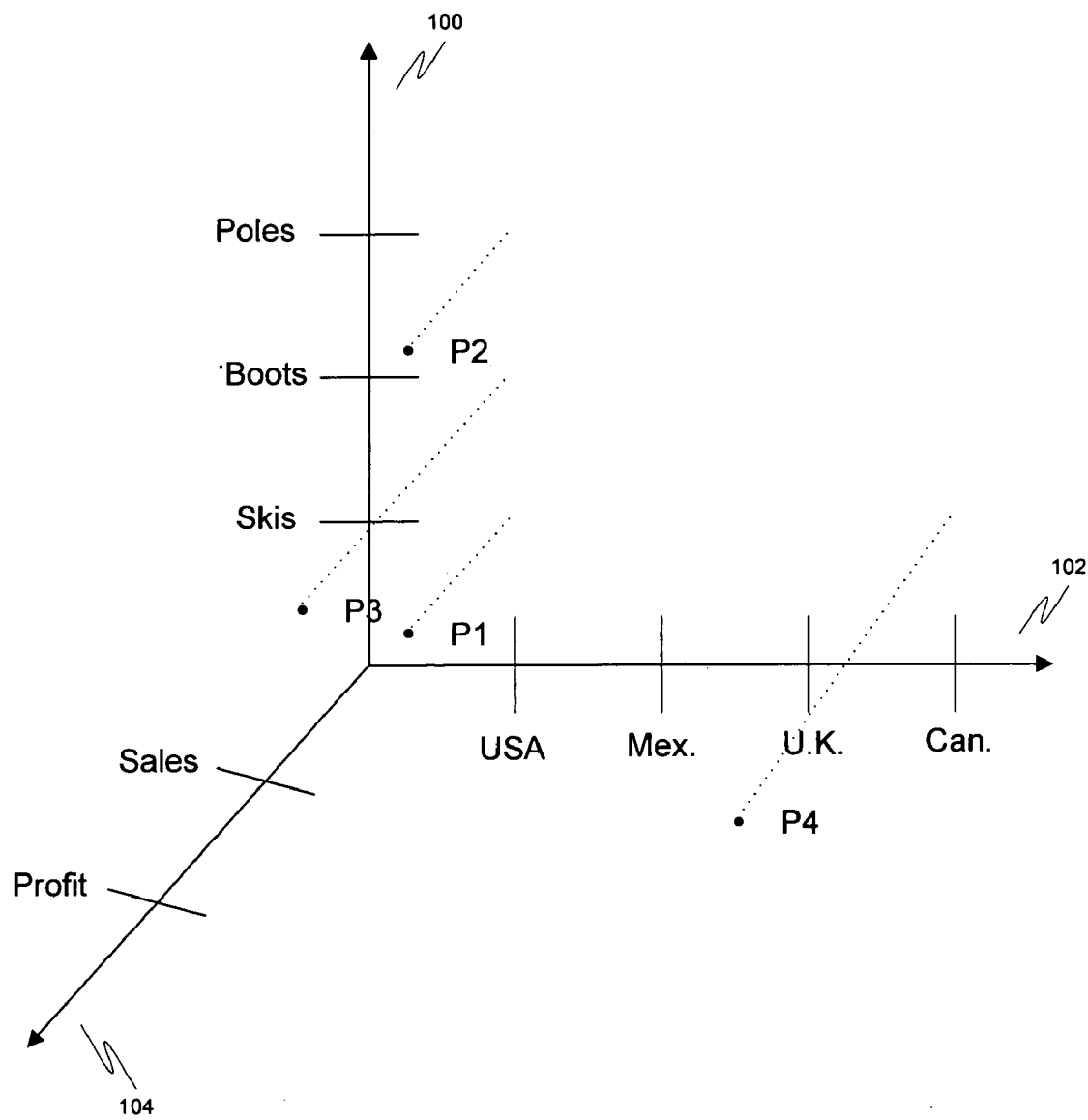
FIG. 1 is a graph diagram illustrating an example of a small multidimensional database.
Figure 2:
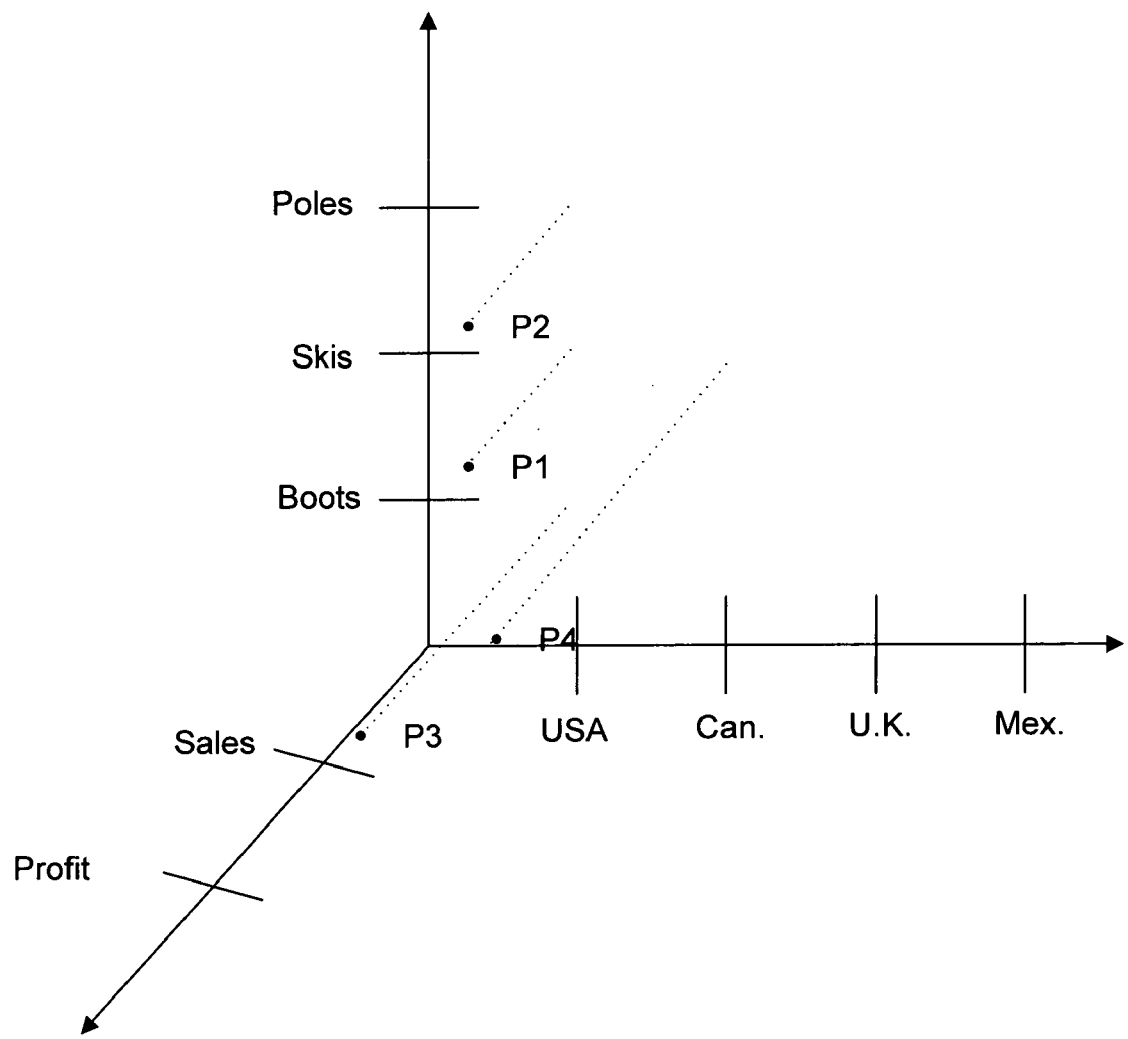
FIG. 2 is a graph diagram illustrating another example of a small multidimensional database with an alternative ordering of items within dimensions.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

A solution is provided in which regions are formed incrementally as points are added to a database. Each time a point is added to the database, it may be assigned to a new region. This new region may then be compared against each of the current set of regions until one is found with which it can be successfully merged. Then, this newly merged region may be compared against each of the other regions until one is found with which it can be successfully merged. This process repeats until there are no more regions that can be merged. Determining whether or not a region can be merged with another region may involve determining whether or not the points in one region differ from the points in the other region only along one dimension. If so, then the point can be successfully merged with the region. This solution remedies the problems with past solutions, which involved analyzing the entire data set a priori and using geometric distance as the criterion to form regions.

What follows is a description of the data structures that may be used to implement an embodiment of the present invention. It should be noted that these are merely examples of data structures, and that one of ordinary skill in the art would recognize that there may be a number of different data structures potentially used to implement an embodiment of the present invention, many of which will not be specifically discussed in this document. As such, the examples provided should not be read to be in any way limiting to the scope of coverage.

Each point may be represented as a structure that contain an array of values for the coordinates and a value for the value of the data point. This may be represented as follows:

```
Struct Point
{
    int      coords[N_DIMS];
    VALUE_TYPE value;
}
```

In this document, {a, b, c, ..., <value>} may be used to represent a point's coordinates and its value. In this case a represents the coordinate in the first dimension and b represents the coordinate in the second dimension, and so on.

For example, the point given by {1, 0, 1, 2, <7.5>} has 4 dimensions, whose coordinates are 1, 0, 1, 2 respectively and the value for this point is 7.5.

A simple way to store these points is as an array of such point structures. The ordering of points within the array can be modified to serve a specific purpose, for example, biased towards certain types of queries, or operations. The net amount of memory used will be equal to the number of point structures multiplied by the space for one point, or mem_used=the number of point structures*(N_DIMS*sizeof (int)+sizeof(VALUE_TYPE)). This memory usage can be reduced by storing regions rather than individual points. The idea is to save space for a given coordinate if there are two or more points with similar coordinates.

As such, an array of points may be stored as a 2-dimensional array of coordinates and an array of values, such as:

```
Struct Region
{
    int      coord_list[N_DIMS];
    VALUE_TYPE_LIST value_list;
}
```

In the examples, {[a0, b0, ...], [a1, b1, ...] ... (v1, v2, v3)} may be used to represent the array of coordinates and the array of values in a given region. The [a0, b0, ...] represents the list of coordinates in the 1st dimension, [a1, b1, ...] represents the list of coordinates in the second dimension, and so on. The individual points are given by the cross-product of the coordinate arrays. There is a one-to-one mapping between the points and the values in the value_list.

For example

{[1,0], [2,5], [0], [0], (1.1, 2.2, 3.3, 4.4){ represents a collection of 4 points as follows:

{0,2,0,0,<1.1>},
{0,5,0,0,<2.2>},
{1,2,0,0,<3.3>},
{1,5,0,0,<4.4>}.

The above points are derived by expanding the cross-product of {[1,0]×[2,5]×[0]× [0]}, and associating each of the cross-product elements with the corresponding element from the value array.

Additionally, two regions can be said to differ along only one dimension if there is only one dimension in which the set of values for the region points for the dimension vary between regions. In pseudocode, this may be expressed as:

```
int DetermineDifferenceBetweenRegions(Region r1, Region r2)
{
    int num_differences = 0;
    for each dimension d in the range 1 ... N_DIMS do
    {
        int_list l1, l2;
        /*
            Store the list of coordinates along dimension 'd' for each
            of the regions r1 and r2 into l1 andl2 respectively
        */
        l1 = r1.coord_list[d];
        l2 = r2.coord_list[d];
        Compare the two lists of coordinates l1 and l2
        If the two lists l1 and l2 are different
        {
            num_differences ++;
        }
    }
    return (num_differences);
}
```

In accordance with an embodiment of the present invention, a solution is provided that attempts to add a point p to a list of regions called r1. If there are no regions, the point is simply added as a first region. For each point that is added, the new point is then checked against each existing region until a successful merge candidate can be found. A successful merge candidate is one where the region contains points that only differ from the new point along one dimension. Optionally, this dimension may also be chosen such that it is not a dimension that is labeled as important. This allows, for example, the likelihood of the user being interested in a particular dimension to be utilized by the system in selecting which region to add a point, making the system run more efficiently. This dimension may be selected in a number of ways. For example, the user could simply tell the system which dimension he is most interested in. Alternatively, the system could undertake more rigorous analysis to attempt to predict the interests of the user. In one embodiment of the present invention, this dimension may be selected based upon the application being executed.

If a region matching these criteria is found, then the point may be added to the region. If no such region is found, the point may simply be added as a new region. If a merge occurred, then the process may then repeat with the newly merged region checked against all other regions to determine if another merge can occur. This merging repeats iteratively until no more merging can occur (i.e., no further region matching the criteria to merge can be found).

In an embodiment of the present invention, the following procedures may be used:

```
/*
Adds a point to a list of regions called rl
*/
AddAPoint( Point p, RegionList rl)
{
    Region tempRegion;
    /* form a region out of a single point */
    tempRegion = makeRegion(p);
    /*
        Merge any possible regions from rl with tempRegion
            modifying tempRegion
    */
    Merge(tempRegion, rl);.
    Add tempRegion to rl;
}
/*
    Merges as many regions in rl as possible into the region r.
    This function modifies the input region r - i.e. at the end of the
    function r is the result of merging the input region r with any
    possible candidate regions in rl
*/
Merge(Region r, RegionList rl)
{
Region rc;
    Repeat
    {
        rc = FindCandidateRegion(r, rl);
        if ( rc == null) /* we found no candidate */
            then return;
        /* removes the candidate region from region list */
        Remove rc from rl;
        /* Merge the candidate region rc with r - modifying r */
        MergeRegion(r, rc);
    }
}
/*
    Find a candidate region within the list of regions rl that can
    be merged with the input Region r
*/
FindCandidate(Region r, RegionList rl)
{
    For each region rtemp in the list of Regions rl
    /*
        determine if the number of dimensions that have differences
        in rtemp and r is EXACTLY one
    */
    if (DetermineDifferenceBetweenRegions(r, rtemp) == 1)
    {
        return (rtemp);
    }
    If we find no region that satisfies our conditions then return
    null;
}
/*
    Merge regions r and rc.
    Modifies r to be the merged region.
*/
MergeRegion(Region r, Region rc)
{
    Find the dimension d along which rc and r differ.
    copy rc.coord_list[d] into r.coord_list[d]
    sort r.coord_list[d] in ascending order.
    Add all values in rc.value_list into r.value_list
    Rearrange values in r.value_list so that they can be associated
    one-to-one with the cross-product of Points in r.
}
/*
    Determines the # of dimensions along which two regions differ.
    For example
    Example #1:
    Region r1 = { [0], [2,5], [0], [0], (1.1, 2.2) }
    Region r2 = { [1], [2], [0], [0], (4.4) }
    r1 and r2 differ along two dimensions
    the first dimension r1 has 0 vs r2 has 1
    and
    the second dimension r1 has two coordinates [2,5] vs r2 has only [2]
```

-continued

```
    So number of differences = 2
    Example #2:
    Region r3 = { [0], [2,5], [0], [0], (1.1, 2.2) }
    Region r4 = { [1], [2,5], [0], [0], (3.3, 4.4) }
    r3 and r4 differ along only one dimension
    the first dimension r1 has [0] while r2 has [1]
    all other dimensions have the same set of coordinates in r1 and r2.
    So number of differences = 1
*/
int DetermineDifferenceBetweenRegions(Region r1, Region r2)
{
    int num_differences = 0;
    for each dimension d in the range 1 ... N_DIMS do
    {
        int_list l1, l2;
        /*
            Store the list of coordinates along dimension 'd' for each
            of the regions r1 and r2 into l1 andl2 respectively
        */
        l1 = r1.coord_list[d];
        l2 = r2.coord_list[d];
        Compare the two lists of coordinates l1 and l2
        If the two lists l1 and l2 are different
        {
            num_differences ++;
        }
    }
    return (num_differences);
}
```

For purposes of this disclosure, the term "new region" shall refer to the most recently created or modified region. This may include creation by transformation of a single point into a region, or through the merger of two or more regions. The term "previously existing region" shall refer to any region other than the "new region".

Figure 3:
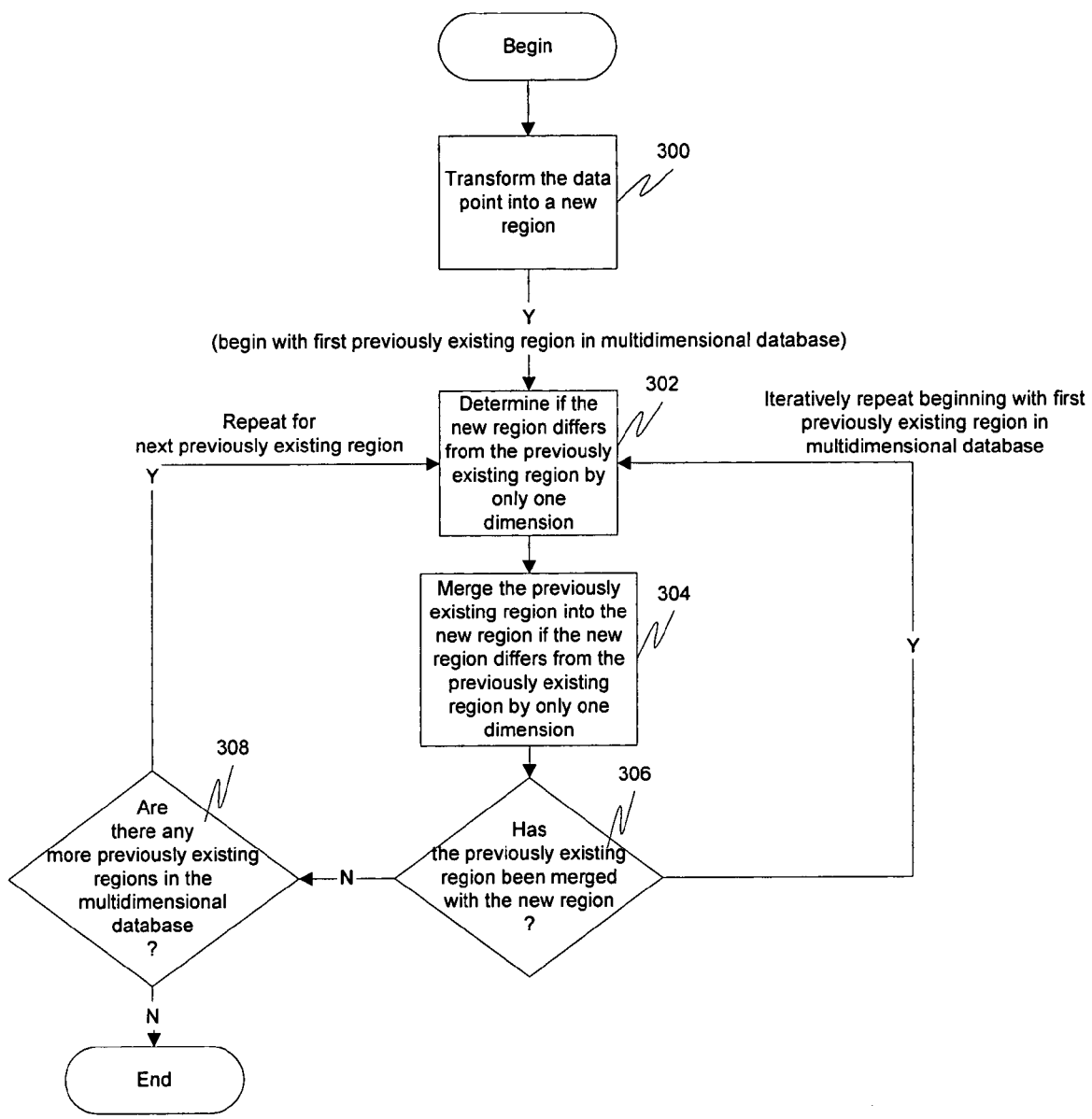
FIG. 3 is a flow diagram illustrating a method for adding a data point to a multidimensional database in accordance with an embodiment of the present invention.

FIG. 3 is a flow diagram illustrating a method for adding a data point to a multidimensional database in accordance with an embodiment of the present invention. Each act in the method may be executed in hardware, software, or any combination thereof. The multidimensional database may have regions. However, when the method is first run it is likely the multidimensional database will have zero regions and the first point will have to be added as a first region. Each of the regions may be stored as a 2-dimensional array of values for the dimensions and an array of values for the corresponding data points. At 300, the data point may be transformed into a new region.

For each previously existing region in the multidimensional database, at 302, it may be determined if the new region differs from the previously existing region by only one dimension. Then, at 304, the previously existing region may be merged into the new region if the new region differs from the previously existing region by only one dimension. One of the dimensions may be classified as more important than the other dimensions in the multidimensional database. This classification may be based upon the likelihood that a user is most interested in the dimension. The merging may then include merging the previously existing region into the new region if the regions differ by only one dimension, wherein the one dimension is any dimension other than the one dimension classified as more important. At 306, it may be determined if the previously existing region has been merged into the new region. If not, at 308 it may be determined if there are any more previously existing regions in the multidimensional database that have not been checked. If so, then the process may loop back to 302 for the next previously existing region in the multidimensional database. If not, however, the process may end. If at 306 it was determined that the previously existing region has been merged into the new region, then the process may iteratively loop to 302 beginning at the first previously existing region (compared against the newly merged region). This process may repeat until all previously existing regions have been checked and no more merging can occur.

Figure 4:
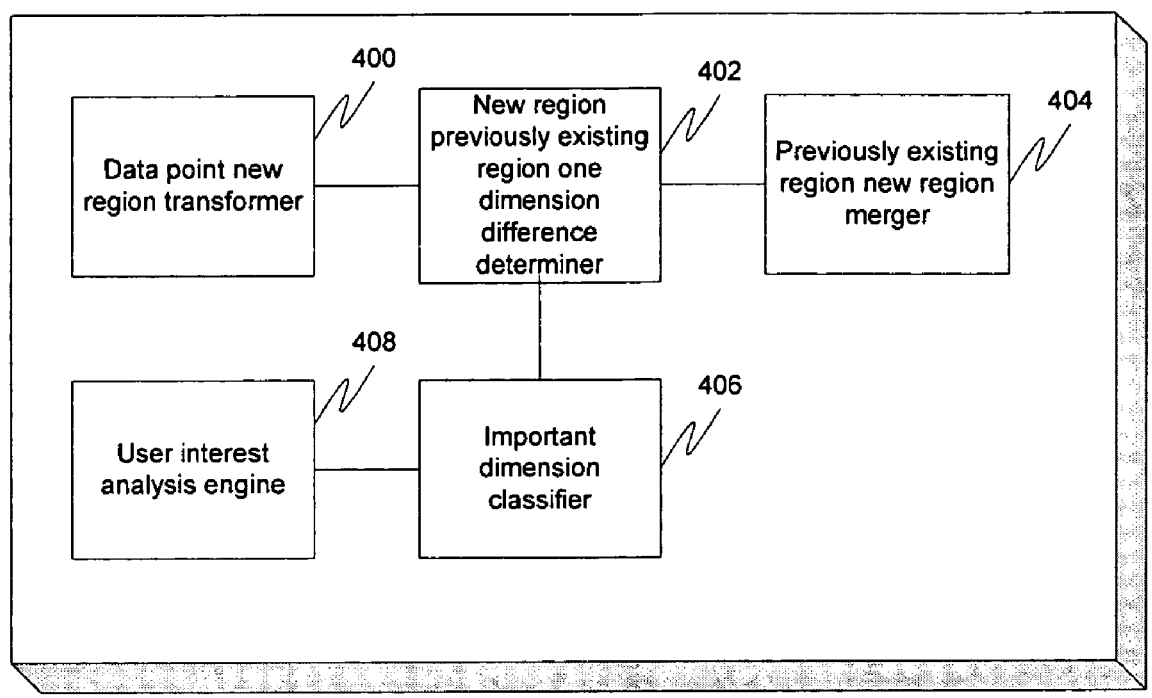
FIG. 4 is a block diagram illustrating an apparatus for adding a data point to a multidimensional database in accordance with an embodiment of the present invention.

FIG. 4 is a block diagram illustrating an apparatus for adding a data point to a multidimensional database in accordance with an embodiment of the present invention. Each element in the apparatus may be embodied in hardware, software, or any combination thereof. The multidimensional database may have regions. However, when the apparatus is first run it is likely the multidimensional database will have zero regions and the first point will have to be added as a first region. Each of the regions may be stored as a 2-dimensional array of values for the dimensions and an array of values for the corresponding data points. A data point new region transformer 400 may add the data point as a new region.

For each previously existing region in the multidimensional database, a new region previously existing region one dimension difference determiner 402 coupled to the data point new region adder 400 may determine if the new region differs from the previously existing region by only one dimension. Then, a previously existing region new region merger 404 coupled to the new region previously existing region one dimension difference determiner 402 may merge the previously existing region into the new region if the new region differs from the previously existing region by only one dimension. One of the dimensions may be classified as more important than the other dimensions in the multidimensional database by an important dimension classifier 406 coupled to the new region previously existing region one dimension difference determiner 402. This classification may be based upon the likelihood that a user is most interested in the dimension, as determined by a user interest analysis engine 408 coupled to the important dimension classifier. The merging may then include merging the previously existing region into the new region if the regions differ by only one dimension, wherein the one dimension is any dimension other than the one dimension classified as more important. It may be determined if the previously existing region has been merged into the new region. If not, then the process may loop back to the process executed by the new region previously existing region one dimension difference determiner 402 and the previously existing region new region merger 404 for the next previously existing region in the multidimensional database. If so, however, then the process may iteratively loop to the process executed by the new region previously existing region one dimension difference determiner 402 and the previously existing region new region merger 404 beginning at the first previously existing region (compared against the newly merged region). This process may repeat until all previously existing regions have been checked and no more merging can occur.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer-implemented method for adding a data point to a multidimensional database having regions, the method comprising:

transforming, with at least one computer, the data point into a new region;

for each previously existing region in the multidimensional database:
  determining, with the at least one computer, if the new region differs from the previously existing region by only one dimension;
  merging, with the at least one computer, the previously existing region into the new region if the new region differs from the previously existing region by only one dimension; and
  repeating said determining and said merging for each previously existing region in the multidimensional database;
wherein said merging comprises a computing platform storing data in a database;
wherein each particular region in the multidimensional database is stored as a separate structure that comprises:
  (a) a value list consisting only of values that (i) were determined to be within the particular region and (ii) are contained in populated non-null cells of the multidimensional database, and
  (b) for each particular dimension in the multidimensional database, a separate coordinate list that only contains, for each particular value in the value list, a coordinate that identifies a position, in the particular dimension, of a particular cell that contains the particular value,
wherein the values in the value list are arranged to associate each value in the value list one-to-one with points that are represented by a cross product of the coordinate list for each particular dimension in the multidimensional database.

2. The method of claim 1, wherein one dimension is classified as more important than other dimensions in the multidimensional database and said merging further comprises merging the previously existing region into the new region if the previously existing region and the new region differ by only one dimension, wherein said one dimension is any dimension other than the one dimension classified as more important.

3. The method of claim 2, wherein the one dimension is classified as more important based upon likelihood that a user is most interested in the dimension.

4. The method of claim 1, wherein a first coordinate list, in a first structure that corresponds to a first region of the regions in the multidimensional database, contains only first-dimensional coordinates of populated cells that contain values in a first value list of the first structure, and wherein a second coordinate list in the first structure contains only second-dimensional coordinates of said populated cells.

5. The method of claim 1, wherein the step of repeating said determining and said merging for each previously existing region in the multidimensional database comprises repeating said determining and said merging until no more merging can occur.

6. The method of claim 1, wherein the step of repeating said determining and said merging for each previously existing region in the multidimensional database comprises, in response to merging two regions together to form a merged region, performing steps comprising:
  determining, with the at least one computer, if the merged region differs from any existing region in the multidimensional database by only one dimension; and
  in response to determining that a particular existing region in the multidimensional database differs from the merged region by only one dimension, further merging, with the at least one computer, the merged region with the particular existing region.

7. A computer-implemented method for adding a data point to a multidimensional database having regions, the method comprising:
  transforming, with at least one computer, the data point into a new region;
  for each previously existing region in the multidimensional database:
  determining, with the at least one computer, if the new region differs from the previously existing region by only one dimension;
  merging, with the at least one computer, the previously existing region into the new region if the new region differs from the previously existing region by only one dimension; and
  repeating said determining and said merging for each previously existing region in the multidimensional database;
wherein said merging comprises a computing platform storing data in a database;
wherein each particular region in the multidimensional database is stored as a separate structure that comprises:
  (a) a value list consisting only of values that (i) were determined to be within the particular region and (ii) are contained in populated non-null cells of the multidimensional database, and
  (b) for each particular dimension in the multidimensional database, a separate coordinate list that only contains, for each particular value in the value list, a coordinate that identifies a position, in the particular dimension, of a particular cell that contains the particular value;
wherein the step of merging the previously existing region into the new region comprises:
  finding, with the at least one computer, the sole dimension along which the previously existing region differs from the new region;
  for each particular coordinate in a first coordinate list that (i) contains only coordinates from the sole dimension and (ii) is in a first structure that corresponds to the new region, copying, with the at least one computer, the particular coordinate into a second coordinate list that (i) contains only coordinates from the sole dimension and (ii) is in a second structure that corresponds to the previously existing region;
  sorting, with the at least one computer, the second coordinate list after said copying is complete; and
  rearranging, with the at least one computer, values in a first value list that is contained in the second structure;
wherein rearranging the value in the first value list associates values in the first value list one-to-one with points that are represented by a cross-product of at least the second coordinate list and one or more other coordinate lists that correspond to dimensions other than the sole dimension.

8. A computer-implemented method for merging a previously existing region of a multi-dimensional database into a new region, the method comprising:
  finding, with at least one computer, a sole dimension of the multi-dimensional database along which the previously existing region differs from the new region;
  for each particular coordinate in a first coordinate list that (i) contains only coordinates from the sole dimension and (ii) is in a first structure that corresponds to the new region, copying, with the at least one computer, the particular coordinate into a second coordinate list that (i)

contains only coordinates from the sole dimension and (ii) is in a second structure that corresponds to the previously existing region;

rearranging, with the at least one computer, values in a first value list that is contained in the second structure;

wherein rearranging the values in the first value list associates values in the first value list one-to-one with points that are represented by a cross-product of at least the second coordinate list and one or more other coordinate lists that correspond to dimensions other than the sole dimension.

9. The method of claim 8, wherein said merging further comprises a computing platform storing data in a database.

10. The method of claim 9, wherein each particular region in the multidimensional database is stored as a separate structure that comprises:

(a) a value list consisting only of values that (i) were determined to be within the particular region and (ii) are contained in populated non-null cells of the multidimensional database, and (b) for each particular dimension in the multidimensional database, a separate coordinate list that only contains, for each particular value in the value list, a coordinate that identifies a position, in the particular dimension, of a particular cell that contains the particular value.

11. The method of claim 8, further comprising:

in response to merging a previously existing region of a multi-dimensional database into a new region, performing steps comprising:

determining, with the at least one computer, if the merged region differs from any existing region in the multidimensional database by only one dimension; and in response to determining that a particular existing region in the multidimensional database differs from the merged region by only one dimension, further merging, with the at least one computer, the merged region with the particular existing region.

* * * * *

UNITED STATES PATENT AND TRADEMARK OFFICE
CERTIFICATE OF CORRECTION

PATENT NO. : 7,584,202 B2 Page 1 of 1
APPLICATION NO. : 11/332536
DATED : September 1, 2009
INVENTOR(S) : Krishnan R. Subramaniam et al.

It is certified that error appears in the above-identified patent and that said Letters Patent is hereby corrected as shown below:

On title page, item (56), in column 2, under "Other Publications", line 6, delete "138." and insert -- 138, 2000. --, therefor.

On title page, item (56), in column 2, under "Other Publications", line 11-12, delete "University." and insert -- University, 1997. --, therefor.

On title page, item (56), in column 2, under "Other Publications", line 14, delete "Foundation." and insert -- Foundation, 1994. --, therefor.

In column 1, line 52, delete "time consuming" and insert -- time-consuming --, therefor.

In column 1, line 54, delete "examiner" and insert -- examine --, therefor.

In column 4, line 35, delete "<7.5 >}" and insert -- <7.5>} --, therefor.

In column 4, line 38, delete "these points" and insert -- these data points --, therefor.

In column 4, line 41, delete "types" and insert -- type --, therefor.

In column 5, line 10, delete "[0]× [0]}," and insert -- [0]×[0]}, --, therefor.

In column 5, line 28, delete "andl2" and insert -- and l2 --, therefor.

In column 6, line 9, delete "AddAPoint( Point" and insert -- AddAPoint(Point --, therefor.

In column 6, line 15, delete "rl);." and insert -- rl); --, therefor.

In column 6, line 18, delete "andl2" and insert -- and l2 --, therefor.

Signed and Sealed this

Twenty-seventh Day of July, 2010

David J. Kappos
*Director of the United States Patent and Trademark Office*